United States Patent [19]
Yealy et al.

[11] 4,106,963
[45] Aug. 15, 1978

[54] METHOD OF MAKING AN ALL PLASTIC CAULKING CARTRIDGE

[75] Inventors: Carl F. Yealy, New Oxford, Pa.; Joseph Abbott, Cincinnati, Ohio

[73] Assignee: Penland Container, Inc., Hanover, Pa.

[21] Appl. No.: 452,103

[22] Filed: Mar. 18, 1974

[51] Int. Cl.² ............... B32B 31/16; B29C 19/00
[52] U.S. Cl. ......................... 156/73.5; 156/244.13
[58] Field of Search .......... 264/68; 53/282; 156/73, 156/69, 580; 220/4 B; 222/326, 327, 390, 391

[56] References Cited
U.S. PATENT DOCUMENTS

| | | | |
|---|---|---|---|
| 2,340,433 | 2/1944 | Skinner | 222/391 |
| 2,646,906 | 7/1953 | Jones et al. | 222/391 |
| 2,831,615 | 4/1958 | Sherbondy | 222/391 |
| 3,297,504 | 1/1967 | Brown et al. | 156/256 |
| 3,690,088 | 9/1972 | Anderson et al. | 152/93.5 |

Primary Examiner—Douglas J. Drummond
Attorney, Agent, or Firm—Seidel, Gonda & Goldhammer

[57] ABSTRACT

A cartridge from which caulking or other similar materials can be dispensed is made by joining first and second members to each other along corresponding annular surfaces as they are rotated relative to each other and pressure is applied to bring them into contact.

13 Claims, 7 Drawing Figures

METHOD OF MAKING AN ALL PLASTIC CAULKING CARTRIDGE

This invention relates to a method for making a cartridge, and more particularly to a method for making a cartridge comprised of a high density rigid thermoplastic from which caulking or other similar materials can be dispensed.

Throughout this specification the term caulking describes a substance that is soft enough to extrude and is capable of subsequent hardening to form a permanent bond with the substrate.

Typically, cartridges which are used to dispense caulking comprise a metal spout which is crimped or otherwise connected to a cardboard body. A plunger made of suitable material is located in the body at a location remote from the spout so that the caulking is confined in the body. Since the caulking hardens upon exposure to air, it is essential that the cartridge be airtight at sale and remain airtight during use.

It has been found that caulking cartridges can be made entirely from high density rigid thermoplastic at substantially less cost than cartridges presently known. Thus, one piece plastic caulking cartridges have been made by the processes of injection molding and by extrusion blow molding. However, there are inherent problems with each of these processes. Thus, they do not lend themselves to the manufacture of caulking cartridges.

Thus, as explained above, the caulking cartridges must be kept airtight. However, this cannot be done very well by the injection molding or extrusion blow molding processes. This is because a tapered core is required in injection molding. Thus, the cartridge body formed thereby would be tapered itself. Thus, even if the taper were slight, the result would be that the fit of the plunger would vary as it moved along the length of the cartridge body.

Further, in extrusion blow molding processes there is no control over the inside diameter of the article formed. Thus, it is likely that the inside wall of the cartridge body would have both thick and thin spots interfering with the airtight seal of the plunger.

Recognizing these difficulties, there have been attempts to separately form the spout and body of a caulking cartridge and then unite them by heat sealing. However, the source of heat must be applied to the outer walls of the spout and body. This upsets and deforms the outer surface of the device making it visually unappealing. Furthermore, the application of heat to the body results in variations in wall thickness therein to the extent that it is likely that the airtight seal created by the plunger could be lost.

There have been attempts at joining components of plastic tubes by spin welding techniques. Typical of such an attempt is U.S. Pat. No. 3,446,688 issued May 27, 1969 to Valer Flax. However, the techniques disclosed in that patent lend themselves for use only where relatively thin walled containers made of low density thermoplastic are to be joined. Thus, in that patent one of the members to be joined is actually forced into contact with the other by means of an anvil surface which it engages during rotation.

On the other hand, with the subject device, high density rigid plastics are used. This is because it is important that the caulking cartridge retain its shape during use. Further, a high density plastic results in a barrier against air entering the cartridge.

Thus, the subject invention discloses a method of making all plastic caulking cartridges from two components which may be joined together. Advantageously, the components of the cartridge can be formed by any conventional plastic shaping method. Thus, for example, the spout can be formed quickly and inexpensively by injection blow molding. The body can be extruded to a generally cylindrical shape.

Furthermore, the spout and body can be assembled into a unitary one piece cartridge without any seams. Such a cartridge would have substantially more strength than existing cartridges. Further it can be made with accurate tolerances so that the cartridge is airtight.

Accordingly, the invention relates generally to a method of making an all plastic cartridge which comprises the steps of urging a first member comprising a generally disc shaped wall with an elongated spout extending therefrom into engagement with a second member comprising a body while rotating one of said members with respect to the other until the thermoplastic melts, and then stopping the rotation and permitting the thermoplastic members to fuse to each other.

For the purpose of illustrating the invention, there is shown in the drawings one form which is presently preferred; it being understood, however, that the invention is not limited to the precise arrangement and instrumentalities shown.

Figure 1:
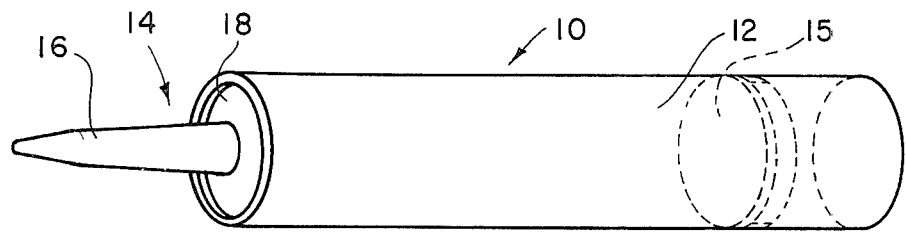
FIG. 1 is a perspective view of one form of cartridge which has been constructed in accordance with the invention.

Now referring to the drawings for a detailed description of the invention, a caulking cartridge 10 is generally illustrated in FIG. 1, The cartridge comprises a first member which may comprise a body 12 and a second member 14 which may comprise a spout 14. A plunger 15 which may be made of thermoplastic material is in body 12. The plunger 15 is moved through the body to force the material therein out nozzle 16 which is supported on wall 18. Suitable means which are described in detail herein are provided for coupling the spout 14 to the body 12.

Typically, the spout 14 and body 12 may be comprised of a suitable high density, rigid thermoplastic material such as polyethylene.

The spout may be formed by an injection molding process or by any other plastic forming process which is convenient. It comprises a wall 18 with a centrally positioned opening 20. The nozzle 16 is formed integrally with the wall 18. The opening 22 in the nozzle is coaxial with the opening 20. The nozzle is shown with its distal end 24 closed. However, it can be readily opened with a knife to release the contents of the cartridge.

In like manner, the body may also be formed by a convenient thermoplastic forming technique. However, in those applications where the body is to be uniform in cross-section, it can readily be formed by extrusion.

The spout and body are formed so that each is provided with annular surfaces which may be brought into engagement with each other so that they can be assembled to each other.

Figure 2A:
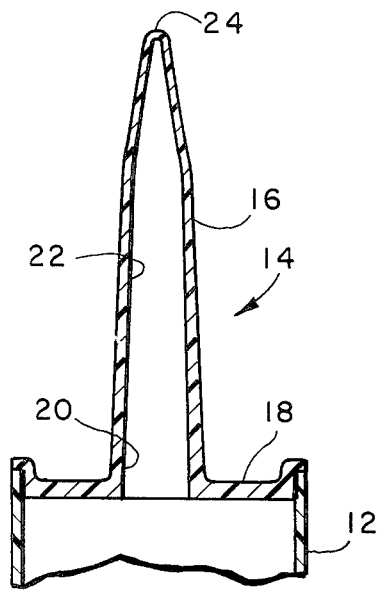
FIGS. 2A and 2B are assembly and exploded views of one embodiment of the spout and body which may be utilized in the method of the subject invention.
Figure 2B:
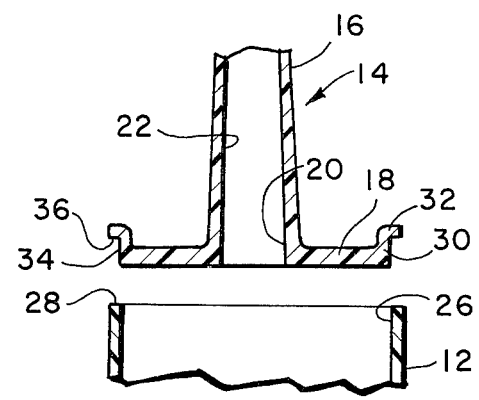

Referring to FIGS. 2A and 2B the body 12 has a first annular surface 26 which is located on its inner periphery adjacent the end to which the spout 14 is to be joined. It has a second annular surface 28 around the end of the tube.

Surfaces which correspond to first and second surfaces 26 and 28 are formed in the spout 14. Thus, a flange 30 is formed around the periphery of wall 18. The flange extends upwardly in the same general direction as nozzle 16. At its free end the flange has a radially outwardly directed annular lip 32.

The outer wall of flange 30 defines as annular surface 34 while the lower wall 36 of lip 32 defines another annular surface 36.

Annular surfaces 26 and 34, and 28 and 36 have substantially the same diameter and the same thickness so that the body and spout can be brought into close fitting contact to each other.

The spout 14 and body 12 are assembled into a unitary device by bringing them into contact with each other along a common axis so that surfaces 26 and 34 are in contact.

One of the members 12 and 14 is rotated with respect to the other at a high speed. The rotation is at a speed which will be high enough to induce an increase in temperature in the thermoplastic along the interface between the spout and the body. The members are brought together while they are rotating relative to each other. Surfaces 26 and 34 have the same diameter so that there is an interference fit when they are assembled. Thus the engagement of these surfaces during rotation generates sufficient heat to melt the material at the interface.

During welding lip 32 prevents the accumulation of beads forming at the edge of the weld under the centrifugal force generated during rotation. Then, the rotation is stopped and the plastic is permitted to fuse along the interface between the spout and the body. The result is a strong unitary all plastic cartridge.

Under certain circumstances, it may be desirable to weld surface 28 to surface 36 on the underside of lip 32. In this instant the diameter of flange 30 is reduced so that there is no contact between surface 34 and surface 26. Thus, when the parts are brought up to speed and brought into engagement with each other a bond will be formed between surfaces 28 and 36. It is not desirable to attempt to form a bond along surfaces 34 and 36 on the spout because the welding takes place over a very short period of time, on the order of about 1/600ths of a second. Thus, if a weld on two surfaces were attempted, it is likely that the parts would freeze together or melt away before such a weld could be accomplished.

Figure 3A:
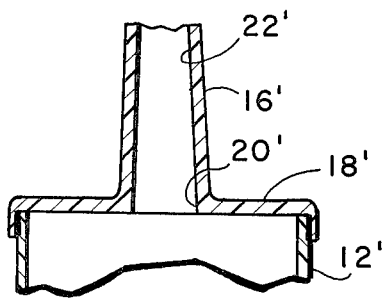
FIGS. 3A and 3B are assembly and exploded views of a second embodiment of the spout and body which may be utilized in the method of the subject invention.
Figure 3B:
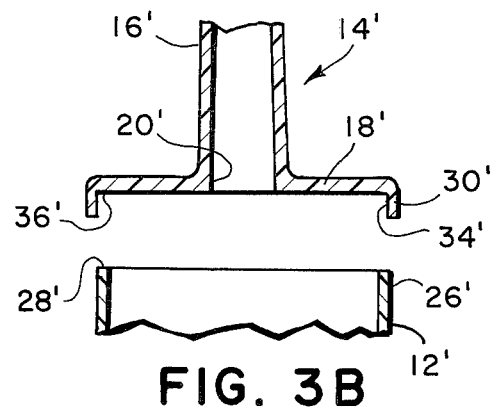

An alternative arrangement of the spout and the body is illustrated in FIGS. 3A and 3B. Thus, wall 18' may have a downwardly extending flange 30', with a radially inwardly directed annular wall 34' which is adapted to come in contact with an annular surface 26' on body 12'.

Additionally, both the spout 14' and the body 12' have second annular surfaces in the form of rim 28' on the body and the surface 36' which is immediately inwardly adjacent flange 30'.

Spout 14' is assembled on body 12' by bringing them into contact with each other so that either annular surfaces 26' and 34' engage each other or annular surfaces 28' and 36' engage each other.

Under some circumstances it may be desirable to simplify the construction of the spout by deleting the outwardly directed lip 32 (FIG. 2).

Figure 4A:
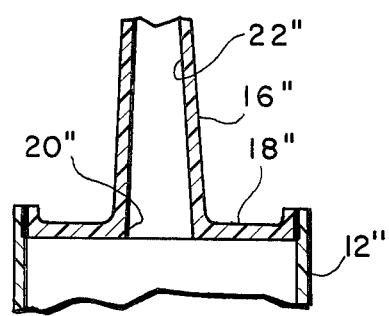
FIGS. 4A and 4B are assembly and exploded view of a third embodiment of the spout and body which may be utilized in the method of the subject invention.
Figure 4B:
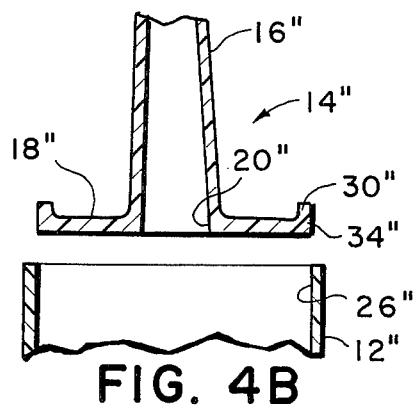

Thus, the FIGS. 4A and 4B illustrate such a construction wherein the spout 14" is connected to the body 12" by the fusing together of the outer annular surface 34" on flange 30" with an inner annular surface 26" on body 12". The cartridge illustrated in FIGS. 4A and 4B is assembled by the method described above.

Significantly, it should be noted that the cartridge which is formed by the method described herein is a one piece all plastic cartridge having substantial strength. Thus, the fusion of the plastic material at the interface between the spout and body in each of the embodiments result in a high strength connection which is generally superior to mechanical techniques for assembly known heretofore. Further, it is also superior in strength and durability to other methods for joining plastics such as heat sealing and the like for the reasons explained above. Since the friction welding does not depend on the compatibility of the thermoplastic used for the body with respect to that used for the spout different thermoplastics can be used for each. Further, because the body is extruded it can be comprised of different materials arranged in layers. For example a layer of Saran which is a vinyl chloride sold by the Dow Chemical Company can be extruded on the interior of the body to effect a barrier to air that would not be possible otherwise.

While the invention has been described with respect to one particular embodiment thereof, it is apparent that many other forms and embodiments will be obvious to a person of skill in the art. Thus, the scope of the invention should not be limited by the foregoing description but, rather, only by the scope of the claims appended hereto.

We claim:

1. A method of making an all plastic caulking cartridge comprising the steps of providing a rigid thermoplastic first member comprising a generally disc shaped wall and an elongated spout extending therefrom, extruding a high density thermoplastic directly into a cylindrically shaped second member comprising a rigid cylindrical body for said cartridge, extruding a liner for said second member at the same time as said second member is being extruded, said second member having a constant inner diameter substantially throughout its length, said first member and said second member being provided with annular surface of substantially the same diameter, maintaining the cylindrical shape of said second member while rotating one of said members at a high speed relative to the other of said members and while urging said first and second members toward each other so that said annular surfaces are in contact to generate friction at the interface of said annular surfaces, maintaining the speed of said rotation sufficiently high so that the thermoplastic along said interface melts, stopping said rotation and permitting said thermoplastic to fuse along said interface.

2. A method as claimed in claim 1 further including the steps of filling said body with material which is to be extruded from said spout, and inserting a plunger at the end of said body remote from said spout to confine said material therebetween.

3. A method as claimed in claim 1 wherein said first member includes an annular flange disposed along the periphery of said disc and said annular surface on said disc comprises a surface of said flange.

4. A method as claimed in claim 3 wherein said annular surface on said flange faces radially outwardly and said annular surface on said second member faces radially inward.

5. A method as claimed in claim 3 wherein said annular surface on said flange faces radially inwardly and said annular surface on said second member faces radially outwardly.

6. A method as claimed in claim 1 wherein said first member is composed of a high density thermoplastic.

7. A method of making an all plastic caulking cartridge comprising the steps of providing a rigid thermoplastic first member comprising a generally disc shaped wall and an elongated spout extending therefrom, forming a high density rigid thermoplastic cylindrical tubular shaped second member comprising a body for said cartridge by extruding said second member directly into said cylindrical tubular shape so that the inner diameter of said second member is constant substantially throughout its length, extruding a liner for said second member at the same time as said second member is being extruded, providing said first and second members with complementary annular surfaces of substantially the same diameter, and permanently securing said first and second members together along said annular surfaces.

8. A method as claimed in claim 7 further including the steps of filling said body with material which is to be extruded from said spout, and inserting a plunger at the end of said body remote from said spout to confine said material therebetween.

9. A method as claimed in claim 7 wherein said first member includes an annular flange disposed along the periphery of said disc and said annular surface on said disc comprises a surface on said flange.

10. A method as claimed in claim 9 wherein said annular surface on said flange faces radially outwardly and said annular surface on said second member faces radially inward.

11. A method as claimed in claim 9 wherein said annular surface on said flange faces radially inwardly and said annular surface on said second member faces radially outwardly.

12. A method as claimed in claim 7 wherein said first member is composed of a high density thermoplastic.

13. A method as claimed in claim 7 wherein said first and second members are secured together by spin welding.

* * * * *